US010479508B2

(12) United States Patent
Joffre (10) Patent No.: US 10,479,508 B2
(45) Date of Patent: Nov. 19, 2019

(54) JUMPSEAT, AND A VEHICLE PROVIDED WITH THE JUMPSEAT (71) Applicant: AIRBUS HELICOPTERS, Marignane (FR)

(72) Inventor: Jean-Francois Joffre, Martigues (FR)

(73) Assignee: AIRBUS HELICOPTERS, Marignane (FR)

( * ) Notice: Subject to any disclaimer, the term of this patent is extended or adjusted under 35 U.S.C. 154(b) by 341 days.

(21) Appl. No.: 15/644,409

(22) Filed: Jul. 7, 2017

(65) Prior Publication Data

US 2018/0009534 A1 Jan. 11, 2018

(30) Foreign Application Priority Data

Jul. 11, 2016 (FR) ..................... 16 01076

(51) Int. Cl.
B64D 11/06 (2006.01)
(52) U.S. Cl.
CPC .......... B64D 11/0691 (2014.12); B64D 11/06 (2013.01)
(58) Field of Classification Search
CPC . B64D 11/06; B64D 11/0691; B64D 11/0647; B64D 11/0619; B64D 11/0638; B64D 11/0649; B64D 11/0698
See application file for complete search history.

(56) References Cited

U.S. PATENT DOCUMENTS

| 4,740,030 A | 4/1988 | Nordskog |
| 7,484,795 B2 | 2/2009 | Saint-Jalmes et al. |
| 9,340,293 B2 | 5/2016 | Guering |
| 2009/0267390 A1 | 10/2009 | Honnorat et al. |
| 2012/0199695 A1* | 8/2012 | Isherwood ......... B64D 11/0691 244/118.6 |
| 2012/0313403 A1* | 12/2012 | Aguirre .............. B64D 11/0015 297/148 |
| 2014/0319275 A1* | 10/2014 | Najd ...................... B64D 11/02 244/118.6 |
| 2014/0368012 A1* | 12/2014 | Burd ...................... B64D 11/06 297/337 |

FOREIGN PATENT DOCUMENTS

| CA | 2791173 | 3/2013 |
| EP | 0170116 | 2/1986 |
| EP | 2484589 | 8/2012 |
| EP | 2574551 | 4/2013 |
| EP | 2583897 | 4/2013 |
| FR | 2863558 | 6/2005 |
| FR | 2980773 | 4/2013 |
| WO | 9617743 | 6/1996 |

OTHER PUBLICATIONS

French Search Report for French Application No. FR 1601076, Completed by the French Patent Office on Mar. 29, 2017, 8 Pages.

* cited by examiner

Primary Examiner — Assres H Woldemaryam
(74) Attorney, Agent, or Firm — Brooks Kushman P.C.

(57) ABSTRACT

A jumpseat having a carrier structure comprising at least one seat pan. The jumpseat comprises a mounting structure provided with at least two arms having at least one degree of freedom to move in rotation about a stowage axis, said carrier structure being hinged to each arm by a pivot arrangement, said pivot arrangement being hinged to each arm about a folding axis, the folding and stowage axes being parallel to each other, said pivot arrangement giving the carrier structure at least one degree of freedom to move in rotation relative to the arms about an elevation axis.

17 Claims, 8 Drawing Sheets

JUMPSEAT, AND A VEHICLE PROVIDED WITH THE JUMPSEAT

CROSS-REFERENCE TO RELATED APPLICATIONS

This application claims priority to French patent application No. FR 16 01076 filed on Jul. 11, 2016, the disclosure of which is incorporated in its entirety by reference herein.

BACKGROUND OF THE INVENTION (1) Field of the Invention

The present invention relates to a jumpseat, and to a vehicle provided with the jumpseat. In particular, the vehicle may be an aircraft, possibly an aircraft of the rotorcraft type.

(2) Description of Related Art

For example, an aircraft may include a jumpseat that is used by a crew member. A jumpseat may sometimes be arranged between a cockpit for a pilot and a cabin for passengers.

The term "jumpseat" is used to mean a folding seat that makes it possible to increase the number of seats in temporary manner while leaving empty space at other times.

Such a jumpseat comprises a movable seat pan enabling the space occupied by the jumpseat to be minimized when it is not being sat on. The seat pan may be moved from a single position referred to for convenience as the "sitting" position to a position referred to as the "retracted" position. The seat pan is thus positioned in the sitting position in order to enable a person to sit down, and in the retracted position in order to reduce the space occupied by the jumpseat.

Certain jumpseats are not compatible with stringent certification regulations, in particular in terms of withstanding a crash.

Other jumpseats are not ergonomic and present a kinematic that is complicated in order to move the jumpseat from the retracted position to the sitting position, and vice versa.

Documents EP 0 170 116 and U.S. Pat. No. 4,740,030 describe a jumpseat that has a seatback and a seat pan. Furthermore, the jumpseat includes a mount that is fastened to a wall of a vehicle.

The mount comprises a vertical arm and a horizontal arm.

The seat pan is movable in rotation relative to the seatback between a deployed position that is horizontal and a retracted position that is vertical. A first spring tends to position the seat pan in the vertical retracted position.

Furthermore, the seatback is hinged to the vertical arm of the mount. The seatback and the seat pan are then movable together in rotation between a utilization position and a stowage position that tends to place the seat pan against the wall. A second spring tends to place the seatback together with the seat pan in the stowage position.

In order to redeploy the jumpseat, the seat pan and the seatback are then moved into the utilization position by turning through 90 degrees relative to the wall. Thereafter, the seat pan is moved from its vertical retracted position to its horizontal deployed position by turning through 90 degrees relative to the seatback. Under such circumstances, the horizontal arm receives and supports a portion of one edge of the seat pan.

Document EP 0 170 116 thus describes a jumpseat that can be put into a single sitting position. Specifically, the jumpseat is in this single sitting position when the seatback is in its utilization position and when the seat pan is in its horizontal deployed position.

Document EP 2 583 897 describes a jumpseat similar to that type of jumpseat.

Document WO 96/17743 describes a jumpseat for a vehicle, and referred to as a folding seating unit. The jumpseat can be folded flat and sideways into a retracted position under a window. The jumpseat can be arranged behind decorative side panels without masking the windows or obstructing a loading zone of the vehicle floor.

The jumpseat comprises a seat pan that rests on an outer bent tube hinged to the wall of the vehicle and an inner bent tube resting on the floor in a sitting position. A retraction mechanism causes the inner bent tube to be folded automatically against the seat pan when the seat is tilted towards its retracted position.

Documents CA 2 791 173, FR 2 980 773, and EP 2 574 551 describe an aircraft jumpseat including a frame. The frame carries a headrest, a seatback, and a seat pan. The frame is mounted to pivot relative to a structural upright by means of a hinge assembly having two hinges. The jumpseat can then be arranged in three positions.

In particular, the jumpseat may be put into a first position in which it closes an aisle, the seatback being perpendicular to a longitudinal axis of the aisle. A person sitting on the jumpseat can then face only towards the front of the aircraft.

Furthermore, the jumpseat may be put into two other positions, the seatback then being substantially parallel to the longitudinal axis of the aisle in these other two positions.

Document EP 2 484 589 describes a jumpseat having a seatback and a seat pan hinged to the seatback.

The seatback slides laterally on rails in order to be placed in a retracted position within a seatback, and in order to be extracted from the seatback into the sitting position.

The above-described jumpseats thus do not enable a person sitting on the jumpseat to face either towards the front or else towards the rear of the aircraft as so desired. Furthermore, those jumpseats do not include crash protection systems to make them "crash-worthy".

Document FR 2 863 558 describes a seat having a seat pan and a seatback.

Document FR 2 863 558 is remote from the field of the invention and does not relate to a jumpseat.

Document US 2014/319275 is also known.

BRIEF SUMMARY OF THE INVENTION

An object of the present invention is thus to propose a jumpseat making it possible to overcome the above-mentioned limitations.

The jumpseat is then provided with a carrier structure, the carrier structure comprising at least one seat pan that is movable in rotation about a retraction axis, the jumpseat comprising a mounting structure for mounting the carrier structure on a wall, possibly a vertical wall.

The mounting structure comprises at least two mounting assemblies, each mounting assembly comprising an arm and a hinge for fastening to the wall, the hinge of a mounting assembly giving the arm of the mounting assembly at least one degree of freedom to move in rotation about a stowage axis. Each arm is movable in rotation about the corresponding stowage axis from a storage position seeking to retract the carrier structure against the wall, to a utilization position away from the wall and that is reached in particular to enable a person to sit on the carrier structure. Furthermore, the carrier structure is hinged to each arm by a pivot arrangement, the pivot arrangement being hinged to each arm about a folding axis, the folding and stowage axes being mutually parallel. The pivot arrangement gives the carrier structure at least one degree of freedom to move in rotation relative to the arms about an axis referred to as the "elevation" axis since it extends from a floor towards a ceiling. The carrier structure is movable in rotation about the elevation axis from a first position to the second position, at least when said arms are in their utilization positions.

Under such circumstances, the jumpseat comprises a carrier structure comprising at least one seat pan. The seat pan is movable in rotation about a retraction axis from a retracted position to a sitting position, it being possible for a person to sit on the seat pan when it is in the sitting position. In order to be moved from the sitting position to the retracted position, the seat pan may receive a spring or a gas actuator enabling it to be returned automatically towards the retracted position. A holding system may also be used to block the seat pan on request in the retracted position and/or in the sitting position.

The carrier structure may also include a seatback. The seatback may comprise a fabric that is under tension when the seat pan is positioned in the utilization position, or indeed it may comprise a rigid frame.

In addition, the carrier structure may also comprise a retaining system, such as a harness, for example. Such a retaining system may comprise at least one strap, and possibly also a winder.

In the invention, the carrier structure is attached to a wall by means of a mounting structure.

The mounting structure includes two arms. Each arm is hinged to the wall by means of a hinge, and to the carrier structure by means of the pivot arrangement.

The term "arm" is used to designate an elongate part extending in a direction between two ends. A first end of an arm is hinged to a mechanical part referred to as a "hinge" so as to be movable at least in rotation about the stowage axis. A second end of the arm is hinged to a pivot arrangement. Movement in rotation of an arm about the stowage axis enables the second end to be moved towards or away from the wall carrying the hinge.

Two arms then represent substantially two sides of a deformable quadrilateral. Movement in rotation of the arms about the stowage axis enables the quadrilateral to be deformed so as to move the carrier structure against the wall or so as to move the carrier structure away from the wall.

For example, the carrier structure and the arms may be substantially parallel to the wall when the jumpseat is retracted.

Starting from this position, the arms are moved in rotation about the stowage axis towards their utilization positions.

Under such circumstances, the carrier structure can pivot relative to the arms about the elevation axis from a first position to a second position.

If necessary, the invention makes it possible to turn the carrier structure through an angle of large amplitude, so as to enable a person to be positioned facing in the forward direction of the vehicle, or in the direction opposite to the forward direction, for example.

Furthermore, the arms may possess other degrees of freedom to move, in particular to make it possible to use an energy absorber, or indeed to use an actuator for adjusting the height of the seat pan relative to a floor.

Consequently, the invention proposes a seat of the jumpseat type that is fastened to a wall. By virtue of their linkages, the arms of the mounting structure can enable the jumpseat to satisfy crashworthiness requirements, can enable the installation to go from facing forwards to facing in the opposite direction, and can also be stored along a wall. Furthermore, the architecture of the seat may advantageously make it possible to add the ability to adjust the height of the jumpseat, and possibly also the ability to adjust the position of the jumpseat relative to a direction in which the wall extends longitudinally.

The jumpseat may also include one or more of the following characteristics.

Thus, the carrier structure is movable in rotation through 180 degrees about the elevation axis from the first position towards the second position, said stowage axis being for arranging parallel to said wall.

The jumpseat thus does not limit the position of the seat which may face in the forward direction of the aircraft, or on the contrary, in the opposite direction.

Optionally, the carrier structure is movable in rotation through 90 degrees about the elevation axis from the first position to an intermediate position, and through 90 degrees about the elevation axis from the intermediate position to the second position.

Furthermore, the mounting structure may include an adjustable length actuator connected to at least one arm in order to adjust the height of the jumpseat relative to a floor.

The term "connected" means that the adjustable length actuator co-operates mechanically with an arm, either directly or via other mechanical members, so that the adjustable length actuator is moved by the arm and/or can move an arm.

By way of example, such an adjustable length actuator may be a gas actuator controlled by a control, and in particular a gas actuator that can be blocked by the control. The control is in fluid flow communication with the gas actuator. Such a control may comprise a button that may be positioned on the seatback, for example.

The adjustable length actuator is connected to an arm. Such an adjustable length actuator makes it possible to adjust either the position of the mounting structure relative to the arm, or the position of an arm in order to adjust the height of the seat pan.

Furthermore, the mounting structure may include an energy absorber connected to at least one arm.

The term "connected" means that the energy absorber co-operates mechanically with an arm either directly or via other mechanical members so that a movement of an arm as a result of an impact deforms the energy absorber.

Such an energy absorber may comprise a rigid wire forming a loop arranged around a shaft. An energy absorber may comprise a system that is deformable in compression and/or traction, e.g. of the type described in Document U.S. 2009/0267390.

By way of example, the energy absorber is interposed between an arm and a pivot arrangement. In the event of an accident, the carrier structure and the pivot arrangement move relative to the arm, thereby stressing the energy absorber.

In another example, in the event of an accident, the arms move, thereby stressing the energy absorber.

Where appropriate, an adjustable length actuator and an energy absorber are arranged in series.

Furthermore, the mounting structure may include a human-operable locking system to block said arms at least in the storage position on request.

In another aspect, the hinge of a mounting assembly may give the arm of the mounting assembly at least one degree of freedom to move in translation along a transverse axis for arranging parallel to said wall.

The transverse axis may be different from the stowage axis or it may coincide with the stowage axis.

By way of example, a hinge may be in the form of a sliding pivot enabling the jumpseat to be moved parallel to the wall.

Optionally, a holding system serves to hold the jumpseat in the desired position. By way of example, such a holding system may comprise two hooks for holding the jumpseat in two distinct positions. Alternatively, and by way of example, the holding system may comprise a "comb" co-operating with a holding finger connected to an arm to enable it to be held in intermediate positions. Another alternative consists in using a mechanical and/or hydraulic latch.

In another aspect, the hinge of a mounting assembly may give the arm of the mounting assembly at least one degree of freedom to move in rotation about a transverse axis that is for arranging parallel to the wall.

The transverse axis may be different from the stowage axis or it may coincide with the stowage axis.

For example, the arms may perform a first movement in rotation about their stowage axes in order to pass from the storage position to the utilization position, and vice versa.

Furthermore, the arms may perform a second movement in rotation about their transverse axes as a result of a crash in order to activate an energy absorber, or indeed in order to adjust the height position of the jumpseat.

The deformation of the quadrilateral formed by two arms makes it possible to perform stroke functions in the event of a crash and functions of adjusting the height of the jumpseat.

In a first embodiment, the pivot arrangement includes a rod for each assembly, each rod being secured to the carrier structure and being connected to the corresponding arm by a pivot allowing the rod to move only in rotation relative to the arm about the elevation axis.

A link may be secured to a rod, an adjustable length actuator and/or an energy absorber being arranged between said link and the carrier structure, each arm being movable in rotation about the stowage axis from the storage position to the utilization position, and about a transverse axis that is for arranging parallel to said wall.

The term "and/or" means that either the adjustable length actuator or an energy absorber or indeed an adjustable length actuator and an energy absorber are arranged between the link and the carrier structure.

The movement in rotation of an arm as a result of a crash can lead to a movement in rotation of the rod and of the link, which then stresses the energy absorber, where appropriate.

Conversely, extending or retracting an adjustable length actuator causes the link to move in rotation followed by the rod and the corresponding arm, and under such circumstances, causes the carrier structure to move in elevation.

Optionally, adding a stretchable energy absorber in series with a controlled blocking latch makes it possible to benefit from adjusting the jumpseat in height. A person then elastically deforms the energy absorber while the blocking latch is unlocked, thereby enabling the height of the jumpseat to be adjusted.

In addition, at least one arm may carry a rotary latch, said carrier structure including two slots, said latch presenting two fingers suitable for penetrating respectively into said two slots when the carrier structure is respectively in the first position and in the second position.

The slots may extend in elevation along circular arcs.

In a second embodiment, the pivot arrangement may include a bar extending in elevation along the elevation axis, while being hinged to each arm, the carrier structure comprising a tube arranged around the bar, said seat pan being carried by said tube.

The seat pan is hinged to the tube, or to a structure secured to the tube, such as a seatback or fastener bars, for example.

The structure is relatively simple and compact.

In another aspect, the bar may include first rotary locking means comprising dogs, the tube including second rotary locking means comprising dogs co-operating with the first rotary locking means, a movement in rotation of the tube relative to said bar about the elevation axis causing the first locking means to be disengaged from the second locking means and then causing the first locking means to be re-engaged in the second locking means.

The dogs may be rounded in order to facilitate sliding each dog of the first locking means along a dog of the second locking means while turning the bar. During such turning, the tube is moved in translation relative to the bar along the elevation axis.

Optionally, the carrier structure may include a headrest that is movable in rotation relative to the tube from a vertical position to a horizontal position, the headrest carrying a peg co-operating with an abutment secured to the bar, said peg touching said abutment when the headrest is in the vertical position, said peg being located under the abutment with clearance being present in elevation between the abutment and the peg when the headrest is in the horizontal position so as to allow the tube to move in rotation relative to the bar.

The headrest serves as means for activating movement in rotation of the carrier structure.

When the headrest is in its vertical position, the clearance between the peg and the abutment is not sufficient to allow the dogs of the second locking means to be extracted from the dogs of the first locking means. The carrier structure can then be turned about the elevation axis.

A person then tilts the headrest into its horizontal position in order to increase this clearance and turn the carrier structure.

In another aspect, a locking system may comprise an extensible assembly having two members that are movable relative to each other, one of the two members being hinged to one arm and the other member being hinged to the other arm, at least one blocking means movable in translation being arranged in respective orifices in the two members when the arms are in the storage position in order to lock one member relative to the other member.

One of said members may be an adjustable length actuator.

In addition, the extensible assembly may include an energy absorber, the energy absorber being attached to one of said members and to one of said arms.

The invention also provides an aircraft having a wall, the aircraft including a jumpseat of the invention, said hinges of the jumpseat being carried by the wall.

Optionally, the aircraft may include an aisle extending longitudinally from the rear of the aircraft towards the front of the aircraft, the wall transversely defining the aisle, at least in part, the first position positioning a person sitting on the jumpseat facing the front of the aircraft, and the second position positioning said person facing the rear of the aircraft.

BRIEF DESCRIPTION OF THE DRAWINGS

The invention and its advantages appear in greater detail in the context of the following description of embodiments given by way of illustration and with reference to the accompanying figures, in which.

Elements present in more than one of the figures are given the same references in each of them.

DETAILED DESCRIPTION OF THE INVENTION

Figure 1:
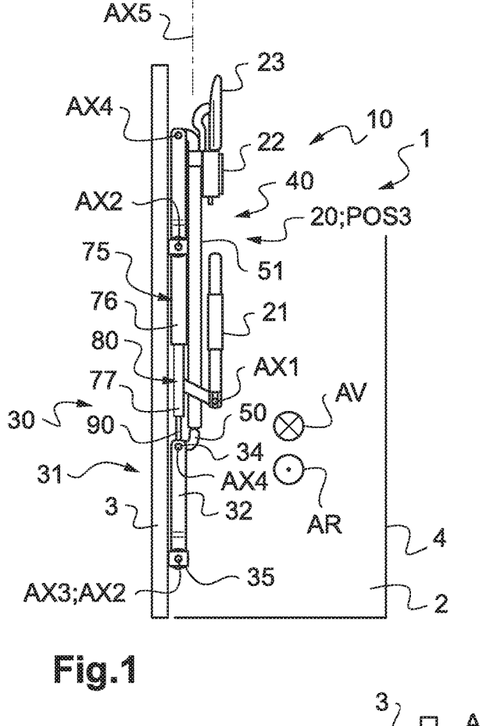
FIGS. 1 to 11 are diagrams showing a jumpseat having arms movable about stowage axes that are substantially horizontal.

FIG. 1 shows an aircraft 1 having a vertical wall 3. The vertical wall 3 may be a wall transversely defining an aisle 2, possibly together with another vertical wall 4. Such an aisle 2 may extend lengthwise from the rear AR towards the front AV of the aircraft.

The invention relates to a jumpseat 10 suitable for stowing against the vertical wall 3. The jumpseat may be unfolded to allow a person to sit on it, if necessary.

Whatever the embodiment, the jumpseat 10 comprises a carrier structure 20 with a seat pan 21. Furthermore, the jumpseat 10 is provided with a mounting structure 30 that interfaces with the carrier structure 20 and the vertical wall 3.

The mounting structure 30 serves to attach the carrier structure 20 to the vertical wall 3, while giving freedom of movement to the carrier structure 20. Thus, the mounting structure 30 enables the carrier structure 20 to be moved towards or away from the vertical wall, and enables the carrier structure to turn about an elevation axis AX5 from a first position towards a second position. When the carrier structure is in the first position, a person sitting on the carrier structure can look towards the front AV of the aircraft. In contrast, when the carrier structure is in the second position, a person sitting on the carrier structure can look towards the rear AR of the aircraft.

Under such circumstances, the mounting structure includes at least two mounting assemblies 31. For example, the mounting structure comprises a top mounting assembly and a bottom mounting assembly, where the terms "bottom" and "top" are relative to the elevation direction of the vertical wall 3 going from a floor to a ceiling.

Each mounting assembly possesses in particular an arm 32 and a hinge 35. The hinge 35 is fastened firstly to the vertical wall 3 and secondly to the corresponding arm 32. The hinge 35 of a mounting assembly provides the arm 32 of the mounting assembly with at least one degree of freedom to move in pivoting about an axis AX2 referred to, for convenience, as the "stowage" axis. The stowage axes AX2 of the arms are at least parallel to each other, and they possibly coincide.

Furthermore, the mounting structure includes a pivot arrangement 41 for hinging each arm 32 to the carrier structure 20. The pivot arrangement is hinged to each arm 32 about a folding axis AX4.

The pivot arrangement may comprise one assembly that is hinged to each of the arms respectively about a folding axis AX4, as shown in FIG. 1. Alternatively, the pivot arrangement may comprise one subassembly per arm, each subassembly being hinged to the corresponding arm about its own folding axis.

Regardless of the alternative, the mounting structure 30 thus has one folding axis AX4 per arm. The folding axes AX4 of the arms are at least parallel to each other, and they possibly coincide. Furthermore, the folding axes AX4 are distinct from the stowage axes AX2, but they are parallel to the stowage axes AX2.

The folding axes AX4 and the stowage axes AX2 give the arms 32 freedom to move in rotation about the corresponding stowage axis AX2 relative to the vertical wall from a storage position POS3 seeking to have the carrier structure 20 close to the vertical wall 3, towards a utilization position seeking to move the carrier structure 20 transversely away from the vertical wall 3.

In addition, the pivot arrangement 40 gives the carrier structure 20 at least one degree of freedom to move in rotation relative to the arms 32 about an elevation axis AX5. Consequently, the carrier structure 20 is movable in rotation about the elevation axis AX5 from the first position towards the second position, at least when the arms 32 are in their utilization positions. Specifically, turning the carrier structure about the elevation axis can be impossible when the arms are in the storage position POS3, because of the proximity of the vertical wall 3.

By way of example, the carrier structure 20 is movable in rotation through 180 degrees about the elevation axis AX5 from the first position POS1 to the second position POS2, as shown in some of the figures.

Between the first position and the second position, the carrier structure may reach at least one intermediate position. The carrier structure 20 is then possibly movable in rotation through 90 degrees in a given direction about the elevation axis AX5 from the first position POS1 to an intermediate position, and through 90 degrees in said direction about the elevation axis AX5 from the intermediate position to the second position.

Furthermore, the seat pan 21 is movable in rotation about a retraction axis AX1. This retraction axis AX1 is parallel to an axis orthogonal to the elevation axis, or indeed it is orthogonal to the elevation axis.

In another aspect, the mounting structure 30 may include an adjustable length actuator of 80 that is connected directly or indirectly to at least one arm 32 in order to adjust the height of the jumpseat 10 relative to a floor.

In another aspect, the mounting structure 30 may include an energy absorber 90 that is connected directly or indirectly to at least one arm 32.

For example, an energy absorber 90 may be secured to an adjustable length actuator 80.

In another aspect, the mounting structure 30 includes a locking system 75 that can be operated by a human in order to block the arms 32, at least in the storage position POS3 on request.

Optionally, the locking system acts directly to prevent the arms from moving, or else indirectly, e.g. by co-operating with an adjustable length actuator 80.

In another aspect, the hinge 35 of a mounting assembly may give the arm 32 of the mounting assembly at least one degree of freedom to move in translation along an axis AX3 referred to, for convenience, as the "transverse" axis. This transverse axis AX3 is parallel to the vertical wall 3, and possibly to an axis perpendicular to the elevation axis AX5. The transverse axis AX3 optionally coincides with or is orthogonal to the stowage axis of the mounting assembly.

In another aspect, the hinge 35 of a mounting assembly may give the arm 32 of the mounting assembly at least one degree of freedom to move in rotation about such a transverse axis AX3 that is to be parallel to said wall 3.

In the first embodiment of FIG. 1, the folding axes AX4 and the stowage axes AX2 are horizontal. These folding axes AX4 and stowage axes AX2 are thus parallel to an axis orthogonal to the elevation axis. Each arm turns about the corresponding stowage axis AX2, this stowage axis AX2 coinciding with the transverse axis AX3 of the mounting assembly, in order to go from the storage position POS2 to the utilization position, and vice versa.

In addition, each arm can move in translation along the stowage axis AX2.

The hinge of a mounting assembly can thus comprise a tube fastened to the wall and extending along the stowage axis AX2 of the mounting assembly. The tube then passes through at least one orifice in the corresponding arm. The arm may then turn about the tube and can slide along the tube.

Furthermore, the jumpseat may include a locking system 75 extending from one end hinged to an arm towards another end for hinging directly or indirectly to another arm.

The locking system 75 comprises an extensible assembly provided with two members 76 and 77 that are movable relative to each other, e.g. in translation. One of the two members 76 is thus hinged to one arm and the other member 77 is hinged to the other arm.

Figure 4:
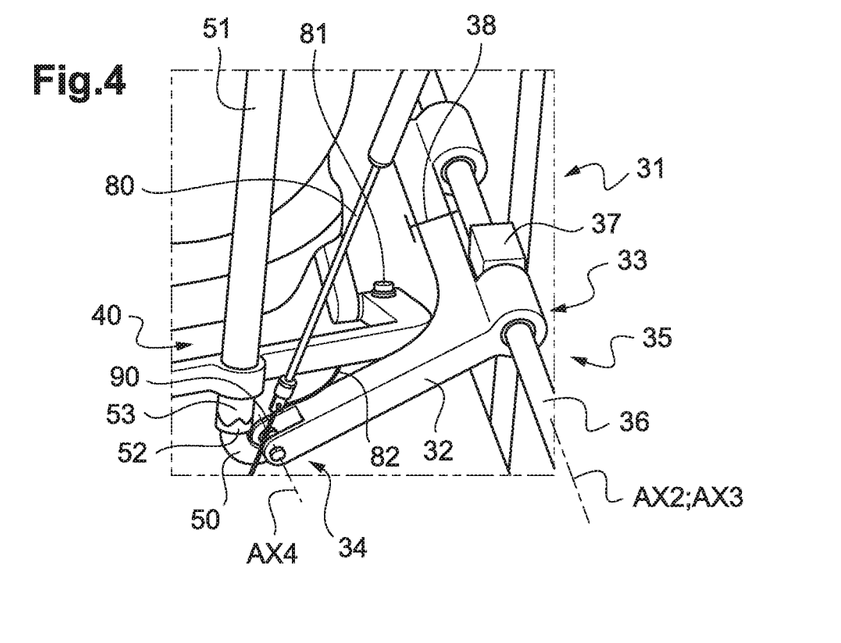

For example, one of the members 77 is an adjustable length actuator 80 controlled by a control button 81 that can be seen in FIG. 4. Such a button is possibly arranged on the seat pan.

Furthermore, the extensible assembly may include an energy absorber 90 that is attached to one of said members 77 and to one of the arms 32.

In the example of FIG. 1, one member of the extensible assembly is hinged to the arm 32 of a top mounting assembly. The other member of the extensible assembly is an adjustable length actuator secured to an energy absorber that is connected to the arm 32 of a bottom mounting assembly.

Figure 2:
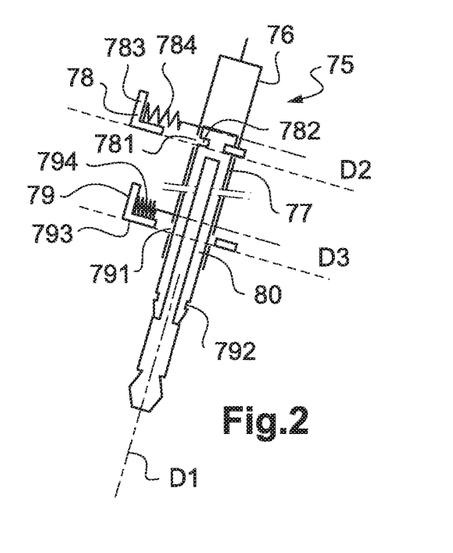

With reference to FIG. 2, one member extends in part inside a tube of the other member, being mounted slidably in the tube. At least one blocking means 78, 79 can prevent one member from sliding relative to the other.

For example, first blocking means are inserted in orifices 781 and 782 of the two members 76 and 77 when the arms 32 are in the storage position in order to lock one member 76 relative to the other member 77. Second blocking means 79 are inserted in orifices 791 and 792 in the two members 76 and 77 when the arms 32 are in the utilization position in order to lock one member 76 relative to the other member 77. Each blocking means 78, 79 may comprise a guillotine 783, 793 that is movable in translation along a direction D2, D3 orthogonal to the direction D1 in which the extensible assembly extends, together with a spring 784, 794 urging the blocking means to take up a position in the orifices in the extensible assembly.

When a person unblocks the first blocking means, the extensible assembly extends.

Figure 3:
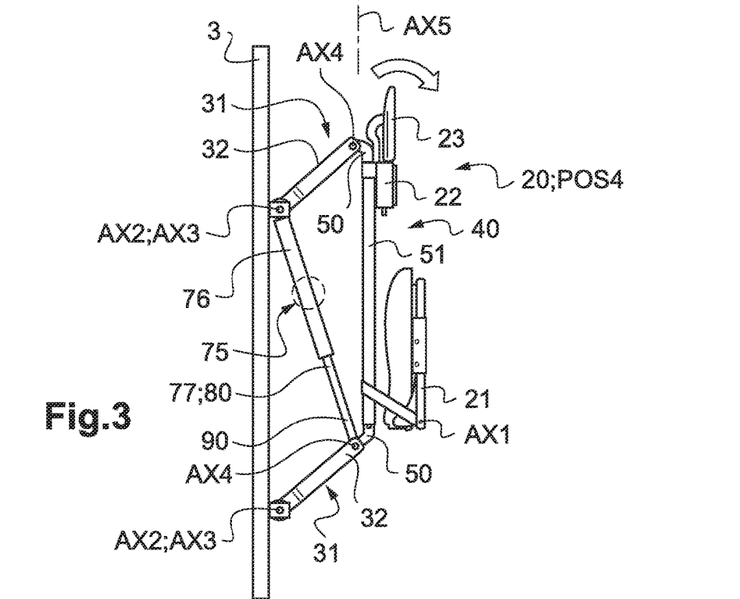

With reference to FIG. 3, the arms then turn about their stowage axes in order to reach the utilization position POS4 shown. The second blocking means 79 then hold the extensible assembly in a stretched position. The inverse operation serves to return to the storage position.

The seat pan can then be moved in order to reach its seat position.

Furthermore, and in the event of a crash, the seat pan then moves towards the floor. This movement stresses the energy absorber.

In addition, the structure may also be turned about the elevation axis AX5.

For this purpose, the pivot arrangement 40 includes a bar 50. The bar extends in elevation along the elevation axis AX5 and is hinged to each arm 32.

FIG. 4 shows an arm 32 of the seat hinged to the bar 50. The arm 32 is carried by a hinge tube of the mounting assembly. A latch 38 involving screws or abutments 37 serves to adjust the position of the arm along the transverse axis AX3 of the tube 36.

In addition, FIG. 4 shows the button 81 as described above for controlling the adjustable length actuator 80.

Figure 5:
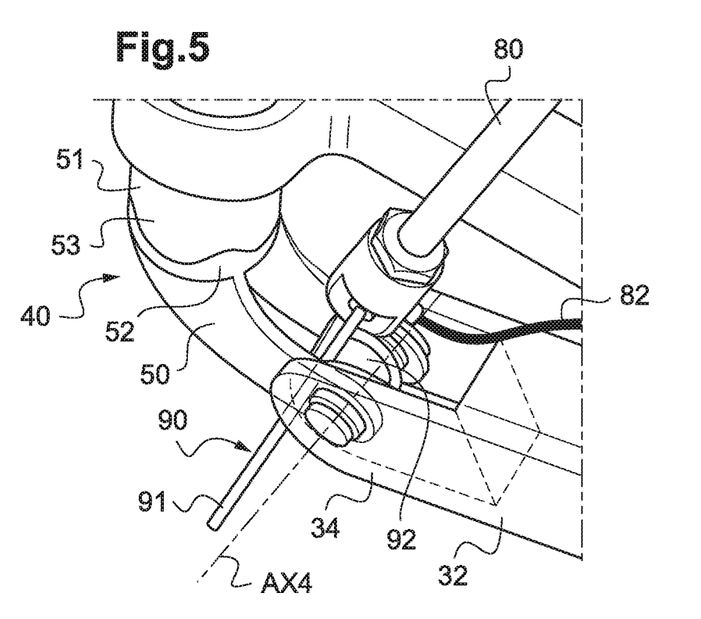

With reference to FIG. 5, the arm has a clevis crossed by a pin 92. The bar 50 then presents a fork arranged in the clevis around the pin 92. Where appropriate, the pin is hinged to a member of the blocking system, or as shown in the figure, to an energy absorber 90.

By way of example, the energy absorber comprises a wire 91 forming a closed loop. The wire 91 extends from a free end towards an end that is secured to the extensible assembly by surrounding the pin 92. It is possible to envisage other energy absorbers.

Furthermore, and with reference to FIG. 5, the carrier structure 20 includes a tube 51 arranged around the bar 50, the seat pan 21 being carried by the tube 51.

The tube possesses a degree of freedom to move in rotation about the bar, and a degree of freedom to move in translation along the bar.

In particular, the bar 50 includes first locking means 52 against rotation and comprising dogs. The bar 50 and the first locking means 52 may constitute the same single part.

In addition, the tube 51 has second locking means 53 against rotation and comprising dogs. The tube 51 and the second locking means 53 may form the same single part.

The dogs form a succession of troughs and crests along a circular peripheral path.

Furthermore, the carrier structure 20 includes a headrest 23. By way of example, the headrest may be carried by the bar, or indeed by a block 22 secured to the bar. Such a block 22 may contain a retaining system with straps.

Figure 6:
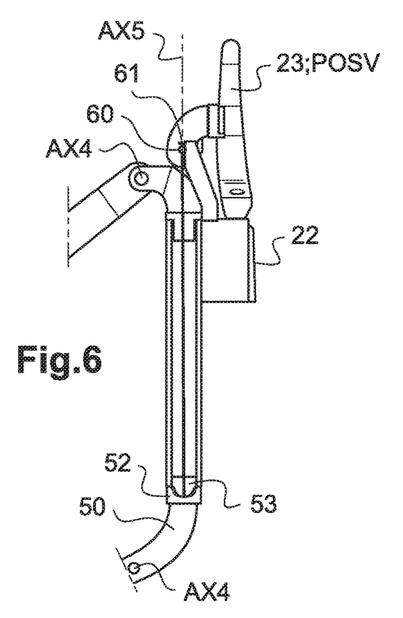

The headrest 23 is fastened to a hinge allowing the headrest 23 to move in rotation relative to the tube 51 from a vertical position POSV shown in FIG. 6 to a horizontal position POSH. The headrest 23 is movable in particular about an axis orthogonal to the elevation axis AX5.

The headrest 23 includes a peg 60 that co-operates with an abutment 61 secured to the bar 50. Such an abutment may comprise a horizontal plate, for example.

The peg 60 is thus in contact with the abutment 61 when the headrest 23 is in the vertical position POSV. Furthermore, the first locking means 52 may engage with the second locking means 53.

In this position, the carrier structure is prevented from moving in rotation. For safety purposes, blocking means, e.g. a resilient member, may be used to tend to hold the headrest 23 in the vertical position POSV.

In order to move the carrier structure in rotation, a person tilts the headrest 23 into its horizontal position POSH, possibly by operating the blocking means.

Figure 7:
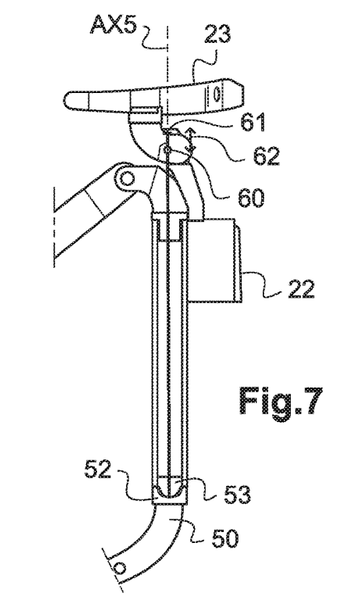

With reference to FIG. 7, movement in rotation of the headrest 23 causes the peg 60 to move relative to the abutment 61. The peg 60 is then located under the abutment 61. Clearance 62 in elevation then lies between the abutment 61 and the peg 60.

This clearance is preferably greater than the depth of the troughs in the dogs of the locking means.

Figure 9:
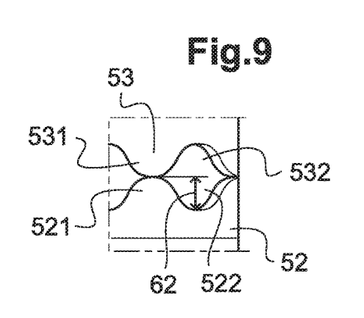

With reference to FIG. 9, a movement in rotation of the tube 51 relative to the bar 50 about the elevation axis AX5 serves to disengage the first locking means 52 from the second locking means 53, and consequently to move the tube in translation relative to the bar. The crests 531 of the second locking means 53 then slide on the first locking means 52 and reach the tops of the crests 521 of the first locking means 52.

By continuing to turn the tube 51 relative to the bar 50, the crests 521, 531 of a second locking means become re-engaged in the troughs 522, 532 of the other locking means.

Figure 8:
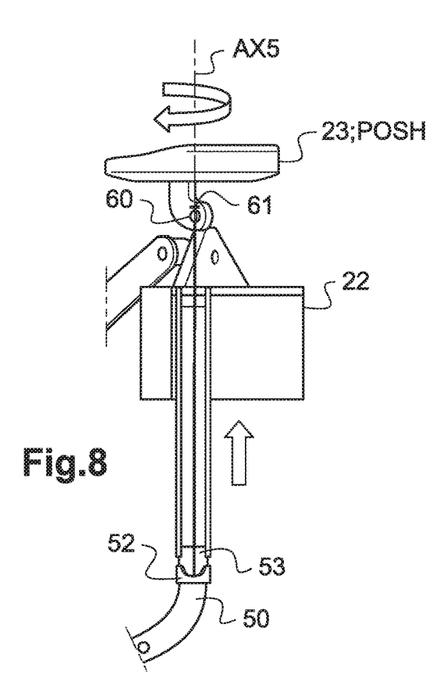

With reference to FIG. 8, an operator can move the tube 51 in rotation relative to the bar 50, e.g. by taking hold of the headrest.

Figure 10:
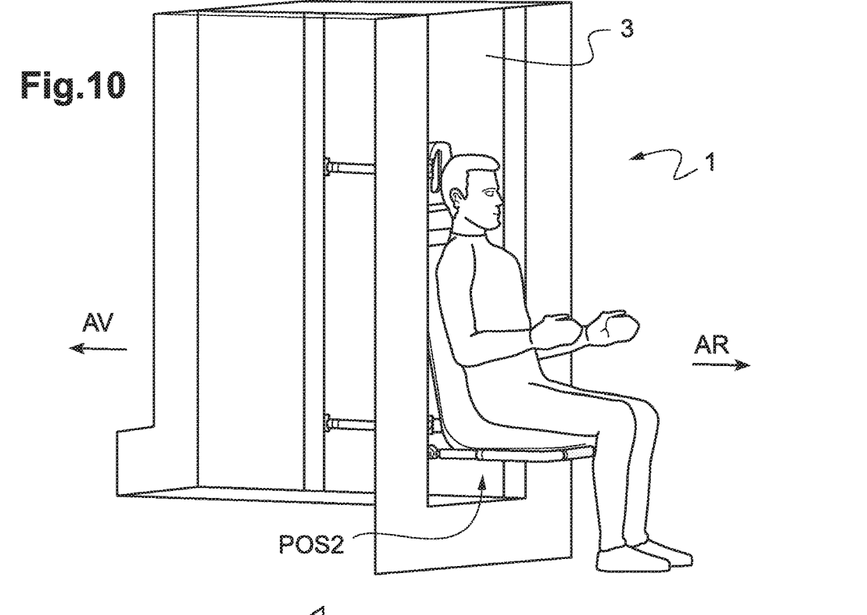
Figure 11:
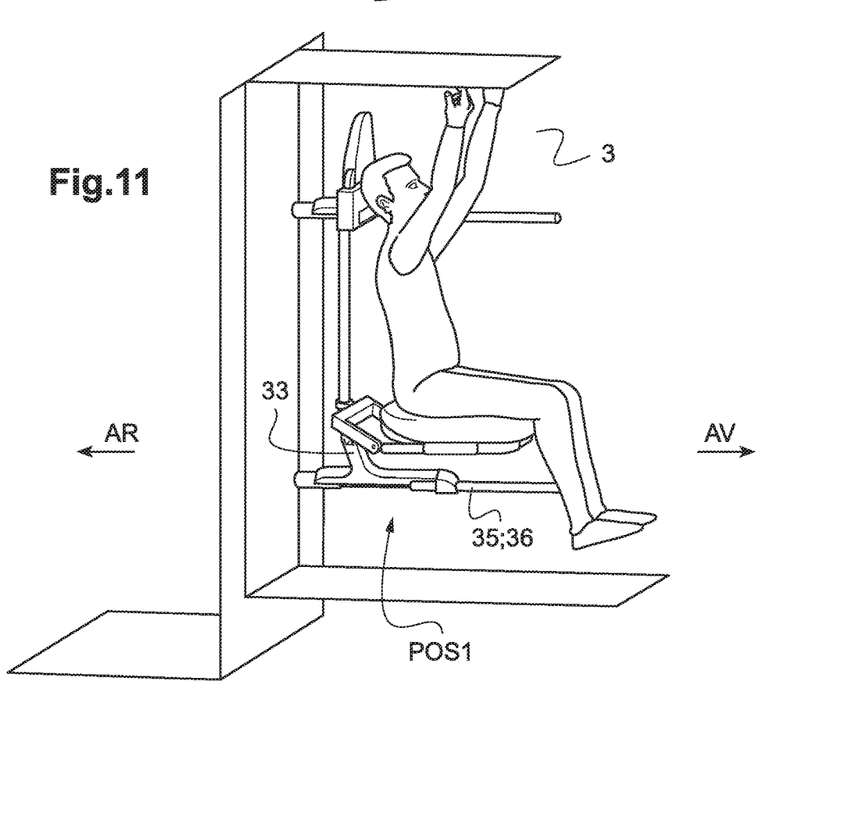

With reference to FIGS. 10 and 11, such a jumpseat makes it easy to position a person either facing the front AV of the aircraft, as shown in FIG. 10, or else the rear AR of the aircraft, as shown in FIG. 11.

Furthermore, the aisle represented diagrammatically may include a step. The person can then operate the adjustable length actuator in order to adjust the height of the seat pan relative to the floor.

In the second embodiment of FIG. 2, the folding axes AX4 and the stowage axes AX2 are vertical. These folding axes AX4 and stowage axes AX2 are thus parallel to the elevation axis AX5. In addition, the folding axes AX4 and the elevation axis AX5 may coincide.

The arms are thus provided with vertical pivots at the vertical wall 3 providing a linkage for folding along the vertical wall 3 in order to store the jumpseat.

In addition, each arm may move in rotation about a transverse axis AX3 of the mounting assembly, the transverse axis being orthogonal to the stowage axis of the mounting assembly. Furthermore, each arm can move in rotation about a transverse axis AX3.

Furthermore, each arm may move in translation along the transverse axis AX3.

The hinge of a mounting assembly can thus comprise a cylinder 351 fastened to the wall to extend along the transverse axis AX3 of the mounting assembly. The cylinder 351 may be surrounded by a slider 352 carrying a pivot hinged to the arm. The pivot is in the form of a rod 353 then passing through at least one orifice in the corresponding arm 32. The arm 32 can then move in rotation about the cylinder, can slide along the cylinder, and can move in rotation about the pivot.

A locking system may serve to prevent the slider from moving in translation relative to the cylinder, while not preventing it from moving in rotation. For example, a locking system may include latches, each suitable for preventing the slider from moving in translation.

Furthermore, the jumpseat may include a locking system for preventing each arm from moving in rotation about the stowage axis AX2 unless forces are exerted by a person. For example, the locking system may comprise a finger 200 that can be retracted into the arm 32. For example, the finger 200 may be blocked against the slider 352 and the wall 3 in the storage position, and may be pressed against the other side of the slider 352 in the utilization position.

Figure 12:
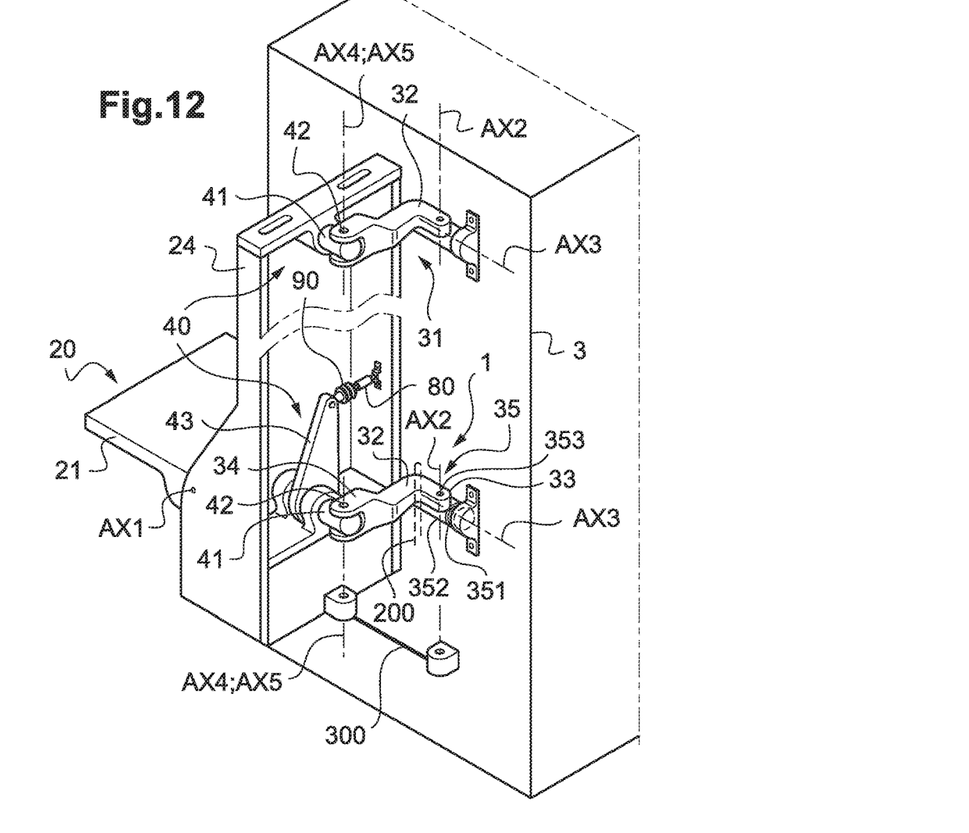
FIGS. 12 to 19 are diagrams showing a jumpseat having arms that are movable about stowage axes that are substantially vertical.

Furthermore, the mounting structure may include a seat pan 31 that is hinged to a seatback 24. The seat pan 21 may be moved in rotation about a retraction axis AX1 in order to reach its seat position as shown in FIG. 12.

The seatback 24 is then carried by the arms via the pivot arrangement 40. Optionally, the seat back 24 can co-operate with a force leg 300.

This pivot arrangement 40 has one rod 41 for each mounting assembly. Each rod 41 is then secured to the carrier structure 20, and where appropriate to the seatback 24. Furthermore, each rod is hinged to the corresponding arm 32 by a pivot 42 that allows the rod 41 to move only in rotation relative to the arm 32 about the elevation axis AX5.

Furthermore, a link 43 may be secured to the rod 41.

The link 43 is then attached to an arrangement comprising an adjustable length actuator 80 and/or an energy absorber 90. This arrangement is also secured to the carrier structure, and where appropriate to the seatback 24.

For example, the link 43 extends from an end that is secured to a rod 41 towards an end that is attached to an energy absorber 90, with an adjustable length actuator 80 being attached to the energy absorber and to an edge of the seatback.

Under such circumstances, by operating the adjustable length actuator 80, a person can cause the arm 32 connected to the adjustable length actuator 80 to turn about the transverse axis AX3. Depending on the direction of turning, the seat pan 21 is then moved either towards or away from the floor.

Figure 13:
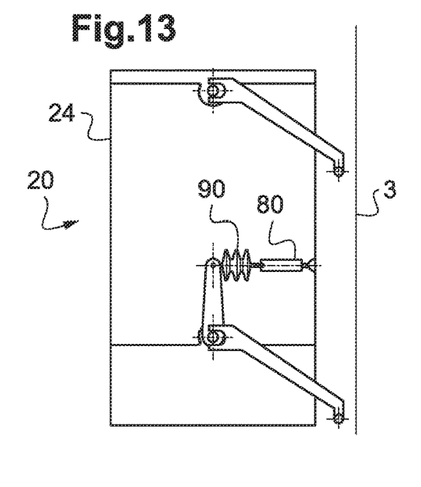
Figure 14:
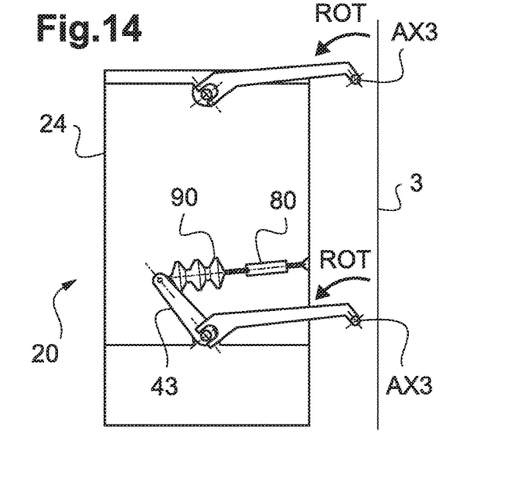

Furthermore, FIG. 13 shows the carrier structure before a crash. Following a crash, and as shown in FIG. 14, the seat pan has moved towards the floor. This movement gives rise to a movement in rotation ROT of the arms 32 about their transverse axes AX3. Under such circumstances, the link 43 moves in rotation. Consequently, the link 43 deforms the energy absorber 90 in traction, compression, and/or twisting.

Figure 15:
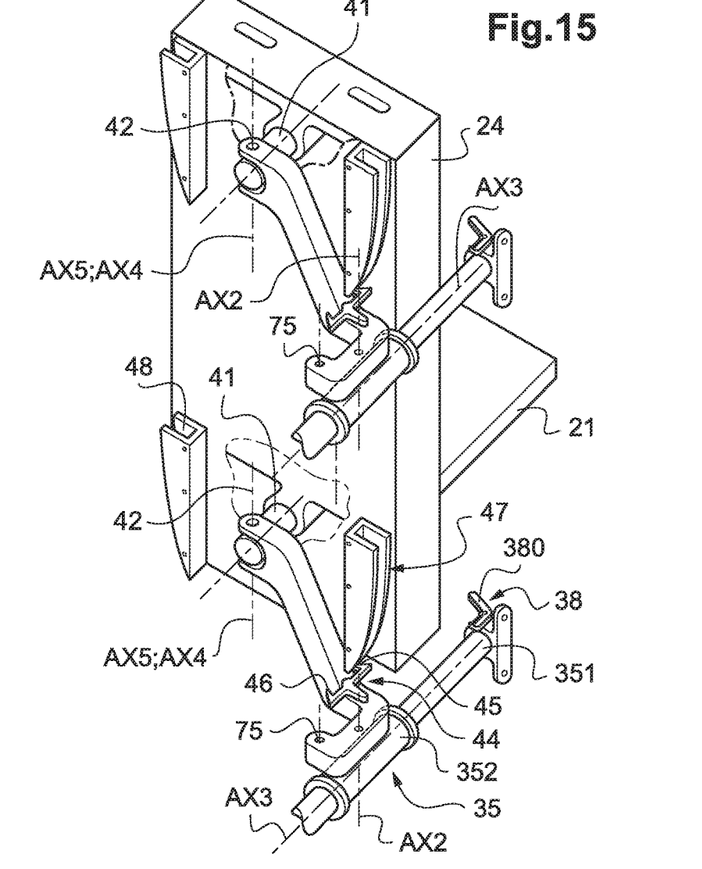

With reference to FIG. 15, at least one arm 32 may carry a rotary latch 44. Such a latch may have two fingers 45 and 46.

The carrier structure 20 then has two slots 47 and 48. The two fingers 45 and 46 can then penetrate respectively in the two slots 47 and 48 when the carrier structure 20 is respectively in the first position and in the second position.

Following a crash or an adjustment in height, the slots can describe circular arcs because of the particular linkage of the carrier structure.

In addition, L-shaped cranks 380 of a holding system enable each slider to be held along the wall.

End-of-stroke abutments may also be arranged to absorb impacts as a result of the carrier structure moving.

It should be observed that FIG. 15 is diagrammatic, and the jumpseat may include members as described above that are not shown, such as for example: an actuator 80, and a locking system 75.

FIGS. 16 to 19 show various positions that can be reached by the jumpseat 10.

Figure 16:
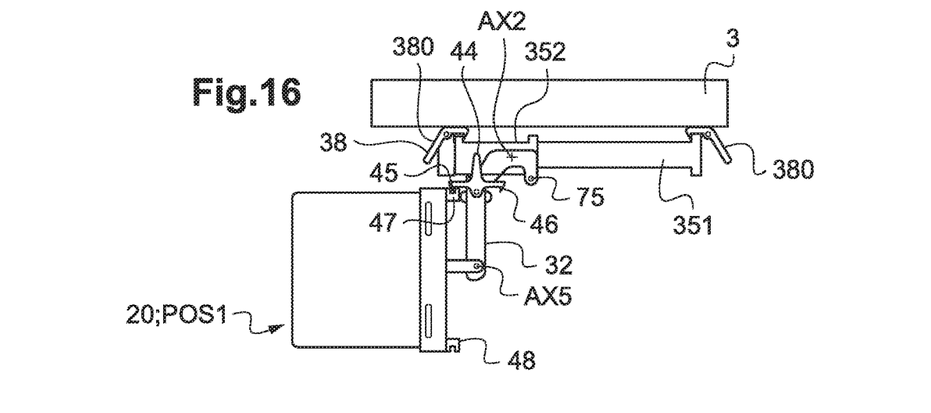

In FIG. 16, the arms are in their utilization positions. In addition, the carrier structure is kept in the first position POS1 by a first finger 45 of the latch 44 engaging with the slot 47.

The first finger can be operated in order to cause the carrier structure 20 to turn through 180 degrees about the elevation axis AX5.

Figure 17:
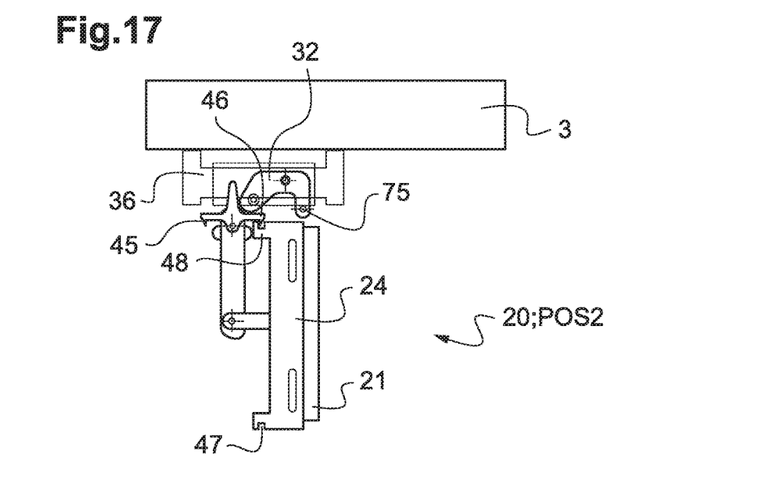

With reference to FIG. 17, the carrier structure is then kept in the second position POS2 by a second finger 46 of the latch 44, engaging the slot 48.

Figure 18:
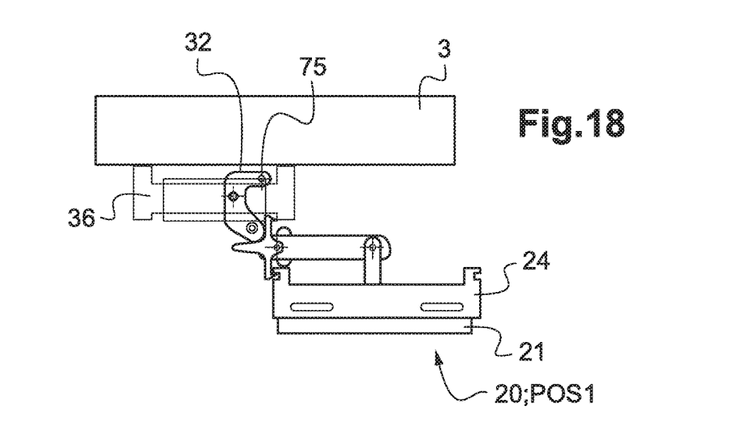
Figure 19:
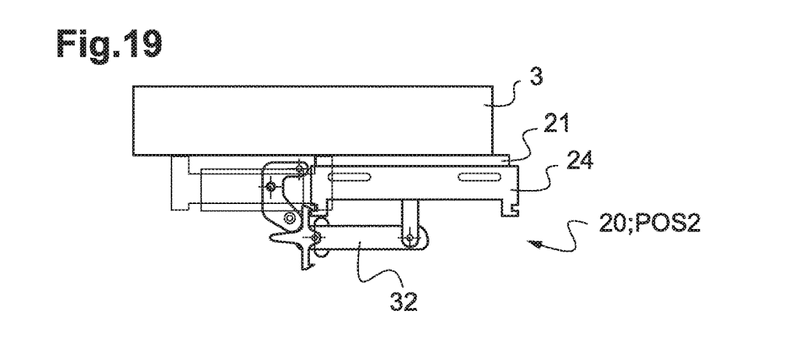

With reference to FIGS. 18 and 19, the arms may be positioned in their storage positions.

The carrier structure is either kept in the first position POS1 shown in FIG. 18 or else it is kept in the second position POS2 shown in FIG. 19.

Figure 20:
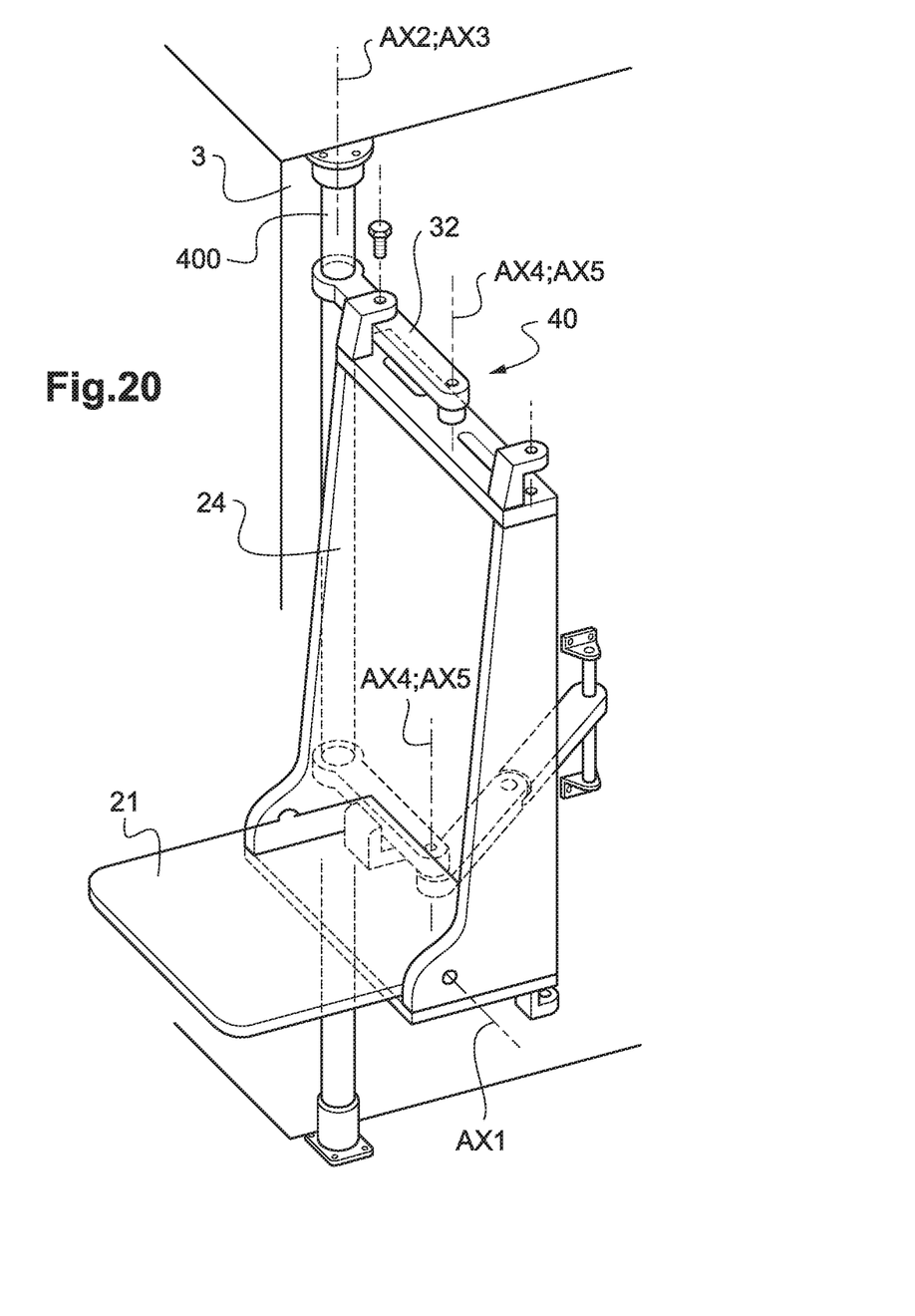
FIG. 20 is a diagram showing a jumpseat having arms that are movable about stowage axes that are substantially vertical and arranged on a vertical bar.

FIG. 20 shows a variant of the second embodiment. In this variant, the arms 32 are hinged to a rail 400 extending parallel to the elevation axis AX5.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A jumpseat having a carrier structure, the carrier structure comprising at least one seat pan that is movable in rotation about a retraction axis, the jumpseat including a mounting structure for mounting the carrier structure on a wall, wherein the mounting structure comprises at least two mounting assemblies, each mounting assembly comprising an arm and a hinge for fastening to the wall, the hinge of a mounting assembly giving the arm of the mounting assembly at least one degree of freedom to move in rotation about a stowage axis, the carrier structure being hinged to each of said arms by a pivot arrangement, the pivot arrangement being hinged to each of said arms about a folding axis, the folding and stowage axes being parallel to each other, the pivot arrangement giving the carrier structure at least one degree of freedom to move in rotation relative to the arms about an elevation axis; each of said arms being movable in rotation about the corresponding stowage axis from a storage position seeking to retract the carrier structure, towards a utilization position that is reached in order to enable a person to sit on the carrier structure, the carrier structure being movable in rotation about the elevation axis from a first position to a second position at least when the arms are in their utilization positions, the carrier structure being movable in rotation through 180 degrees about the elevation axis from the first position towards the second position, the stowage axis being for arranging parallel to the wall.

2. The jumpseat according to claim 1, wherein the carrier structure is movable in rotation through 90 degrees about the elevation axis from the first position to an intermediate position, and through 90 degrees about the elevation axis from the intermediate position to the second position.

3. The jumpseat according to claim 1, wherein the mounting structure includes an adjustable length actuator connected to at least one of the arms in order to adjust the height of the jumpseat relative to a floor.

4. The jumpseat according to claim 1, wherein the mounting structure includes an energy absorber connected to at least one of the arms.

5. The jumpseat according to claim 1, wherein the mounting structure includes a human-operable locking system to block the arms at least in the storage position on request.

6. The jumpseat according to claim 1, wherein the hinge of a mounting assembly gives the arm of the mounting assembly at least one degree of freedom to move in translation along a transverse axis for arranging parallel to the wall.

7. The jumpseat according to claim 1, wherein the hinge of a mounting assembly gives the arm of the mounting assembly at least one degree of freedom to move in rotation about a transverse axis for arranging parallel to the wall.

8. The jumpseat according to claim 1, wherein the pivot arrangement includes a rod for each mounting assembly, each rod being secured to the carrier structure and being connected to the corresponding arm by a pivot allowing the rod to move only in rotation relative to the arm about the elevation axis.

9. The jumpseat according to claim 8, wherein a link is secured to a the rod, an adjustable length actuator and/or an energy absorber being arranged between the link and the carrier structure, each of the arms being movable in rotation about the stowage axis from the storage position to the utilization position, and about a transverse axis that is for arranging parallel to the wall.

10. The jumpseat according to claim 8, wherein at least one of the arms carries a rotary latch, the carrier structure including two slots, the latch presenting two fingers suitable for penetrating respectively into the two slots when the carrier structure is respectively in the first position and in the second position.

11. The jumpseat according to claim 1, wherein the pivot arrangement includes a bar extending in elevation along the elevation axis, being hinged to each of the arms, the carrier structure comprising a tube arranged around the bar, the seat pan being carried by the tube, the bar including first rotary locking means, the tube including second rotary locking means co-operating with the first rotary locking means, a movement in rotation of the tube relative to the bar about the elevation axis causing the first locking means to be disengaged from the second locking means and then causing the first locking means to be re-engaged in the second locking means.

12. The jumpseat according to claim 11, wherein the carrier structure includes a headrest that is movable in rotation relative to the tube from a vertical position to a horizontal position, the headrest carrying a peg co-operating with an abutment secured to the bar, the peg touching the abutment when the headrest is in the vertical position, the peg being located under the abutment with clearance being present in elevation between the abutment and the peg when the headrest is in the horizontal position so as to allow the tube to move in rotation relative to the bar.

13. The jumpseat according to claim 5, wherein the locking system comprises an extensible assembly having two members that are movable relative to each other, one of the two members being hinged to one of the arms and the other member being hinged to the other arm, at least one blocking means movable in translation being arranged in respective orifices in the two members when the arms are in the storage position in order to lock one member relative to the other member.

14. The jumpseat according to claim 5, wherein the locking system comprises an extensible assembly having two members that are movable relative to each other, one of the two members being hinged to one of the arms and the other member being hinged to the other arm, at least one blocking means movable in translation being arranged in respective orifices in the two members when the arms are in the storage position in order to lock one member relative to the other member, and wherein one of the members is the adjustable length actuator.

15. The jumpseat according to claim 5, wherein the locking system comprises an extensible assembly having two members that are movable relative to each other, one of the two members being hinged to one of the arms and the other member being hinged to the other arm, at least one blocking means movable in translation being arranged in respective orifices in the two members when the arms are in the storage position in order to lock one member relative to the other member, and wherein the energy absorber is attached to one of the members and to one of the arms.

16. An aircraft having a wall, wherein the aircraft includes a jumpseat according to claim 1, the hinges being carried by the wall.

17. The aircraft according to claim 16, wherein the aircraft includes an aisle extending longitudinally from the rear of the aircraft towards the front of the aircraft, the wall transversely defining the aisle, at least in part, the first position positioning a person facing the front of the aircraft, and the second position positioning the person facing the rear of the aircraft.

\* \* \* \* \*